United States Patent [19]

Baker

[11] Patent Number: 4,755,038
[45] Date of Patent: Jul. 5, 1988

[54] LIQUID CRYSTAL SWITCHING DEVICE USING THE BREWSTER ANGLE

[75] Inventor: Anthony P. Baker, New York, N.Y.
[73] Assignee: ITT Defense Communications, Nutley, N.J.
[21] Appl. No.: 913,814
[22] Filed: Sep. 30, 1986
[51] Int. Cl.[4] .......................... G02F 1/133; G02F 1/01
[52] U.S. Cl. ............................. 350/347 V; 350/96.14; 350/337; 350/395
[58] Field of Search ................. 350/96.13, 96.14, 334, 350/337, 347 E, 347 V, 381, 395

[56] References Cited

U.S. PATENT DOCUMENTS 2,403,731  7/1946  MacNeille ........................... 350/395
4,278,327  7/1981  McMahon et al. ............. 350/347 V
4,478,494  10/1984  Soref ................................ 350/347 E

OTHER PUBLICATIONS

Born and Wolf, *Principles of Optics*, 2nd Ed., MacMillan Company, New York (1964), p. 43.

Primary Examiner—John K. Corbin
Assistant Examiner—Martin Lerner
Attorney, Agent, or Firm—Robert A. Walsh; Thomas N. Twomey; Mary C. Werner

[57] ABSTRACT

A liquid crystal switching device utilizing the Brewster angle includes a Brewster angle polarizer disposed such that an incident light beam of the device impinges thereon at an angle approximately equal to the Brewster angle.

17 Claims, 1 Drawing Sheet

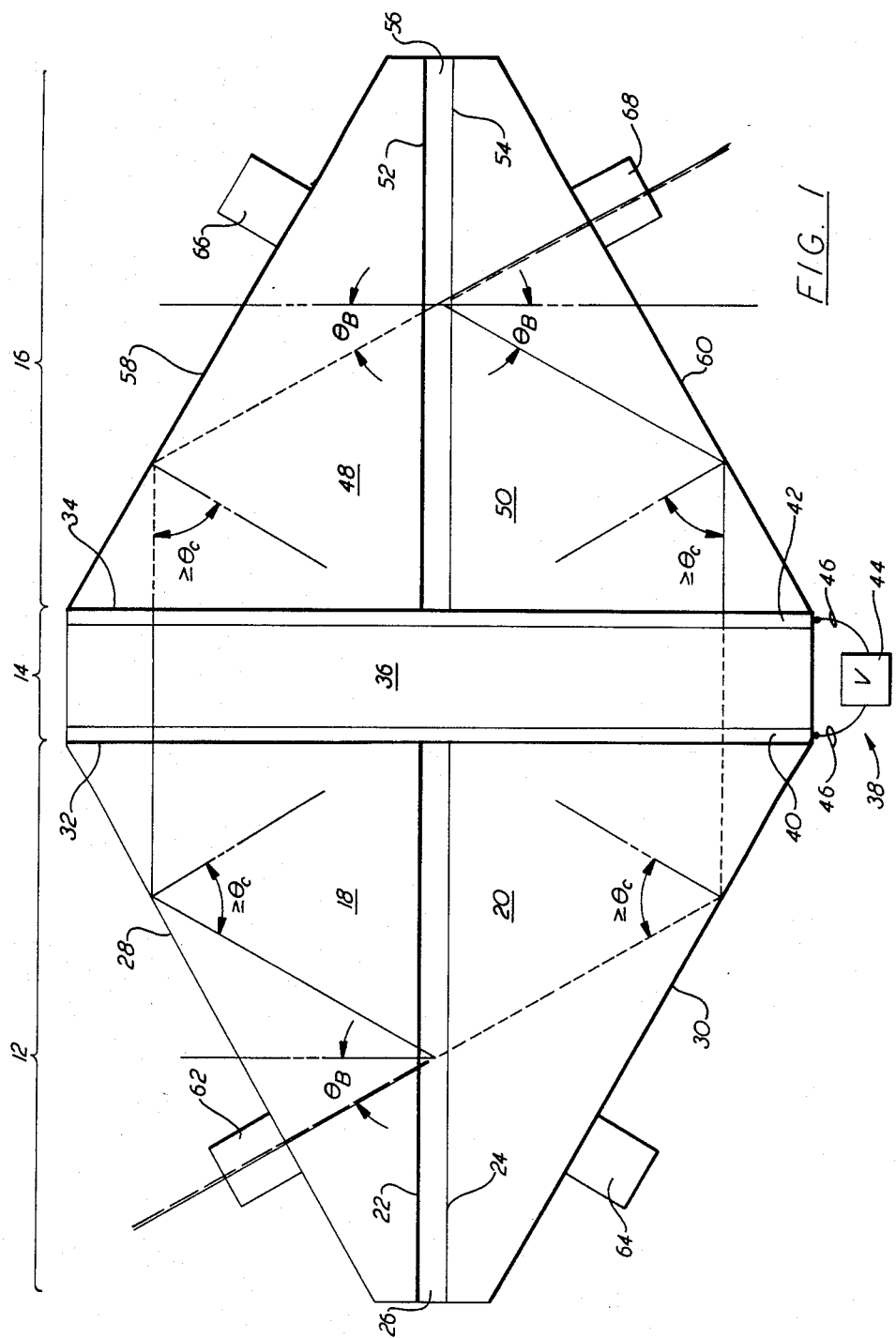

LIQUID CRYSTAL SWITCHING DEVICE USING THE BREWSTER ANGLE

BACKGROUND OF THE INVENTION

The present invention generally relates to a liquid crystal switching device and, in particular, relates to one such liquid crystal switching device including means, disposed at the Brewster angle to the incident light beam, for splitting the incident light beam into the polarized components thereof.

Liquid crystal switching devices, per se, have been known for some time. Typical of such switching devices are those described and discussed in U.S. Pat. No. 4,201,422 issued to McMahon et al. on May 6, 1980, U.S. Pat. No. 4,278,327 issued to McMahon et al. on July 14, 1981, and U.S. Pat. No. 4,385,799 issued to Soref on May 31, 1983. Therein a plurality of liquid crystal switch designs are described wherein an inputted light beam is incident upon a layer of liquid crystal material at the critical angle thereof. In addition, these basic designs include optical fibers attached to the side angled surfaces of a pair of opposing trapezoidal prisms. The trapezoidal prisms are arranged with the bases thereof parallel and include liquid crystal material disposed therebetween.

The device designs so described are both expensive and difficult to manufacture since all of the surfaces of the trapezoidal prisms must not only be optically flat, but must also be fixed at a precise angular relation, specifically the critical angle, to each other.

Consequently, the liquid crystal optical switches described in these U.S. Patents are rather impractical for optical communication systems wherein large numbers of such devices are needed.

More recently a number of inexpensive, readily mass produceable liquid crystal device designs have been described and discussed in the U.S. patent application Ser. Nos. 795,138; 795,148; 795,149; 795,150; 795,151; 795,152; 795,154; 795,155; 795,156; 795,157; 795,296 all filed on Nov. 5, 1985 and assigned to the assignee hereof. These applications are incorporated herein by reference.

In general, all of the liquid crystal switching devices shown and described to date can be characterized as either critical angle devices or evanescent wave coupling devices. In the evanescent wave coupling devices the cores of adjacently disposed optical fibers are exposed such that light signals are coupled across the gap therebetween. In the remainder of the devices, a light beam must be introduced into the device at the critical angle.

As well known in the field of optics, the critical angle is that minimum angle measured from normal incidence whereat an incident light beam is totally reflected at an interface between materials having different indicies of refraction. The critical angle is dependent upon the indicies of refraction of the materials defining the interface whereat the light beam is to be split. In most instances, in the devices described above, the interface includes a layer of liquid crystal material.

As it happens, liquid crystal material is, essentially, a birefringent material, that is, the material exhibits a different index of refraction for each of two different plane polarizations. Using this phenomena, an incident light beam is made to impinge upon a layer of liquid crystal material at an angle such that only one of the plane polarized light components is, effectively, totally reflected. Thus, an incident light beam is divided into the plane polarizations thereof since one plane polarized component is reflected and the other plane polarized component is transmitted through the liquid crystal material.

Thus, typical device designs that have been proposed using liquid crystal material not only to effect beam splitting and beam recombining but also to controllably reorient the polarization of the polarized components. In most of these designs the incident light beam is directed at a layer of liquid crystal material at the critical angle. As a result, the overall length of such devices are geometrically dependent upon the critical angle. Depending on the relevant indexes of refraction the critical angle can become rather large. As a result the overall length of such devices can also be large. This can become a factor in the design of a switching matrix wherein a considerable number of such switching devices are oriented end-to-end.

Consequently, a liquid crystal switching device that does not rely on the comparatively large critical angle and can thus be made shorter is needed to more fully expand the potential benefits of liquid crystal devices and hence, optical signalling systems.

SUMMARY OF THE INVENTION

Accordingly, it is one object of the present invention to provide a liquid crystal switching device that utilizes the Brewster angle as a means for splitting an incident beam into the plane polarized components thereof.

This object is accomplished, at least in part, by a liquid crystal switching device including means, disposed at the Brewster angle to an incident light beam, for splitting the incident light beam into the polarized components thereof.

Other objects and advantages will become apparent to those skilled in the art from the following detailed description read in conjunction with the appended claims and the drawing attached hereto.

BRIEF DESCRIPTION OF THE DRAWING

The single FIGURE of the drawing is a pictorial view, not drawn to scale, of a liquid crystal switching device embodying the principles of the present invention.

DETAILED DESCRIPTION OF THE INVENTION

A liquid crystal switching device, generally indicated at 10 in the FIGURE and embodying the principles of the present invention, includes a beam splitting section 12, a polarization reorientation section 14, and a beam combining section 16.

In one preferred embodiment, the beam splitting section 12 includes first and second transparent members, 18 and 20, respectively, each having a planar surface, 22 and 24, respectively, and a Brewster angle polarizer 26 disposed between the planar surfaces, 22 and 24, respectively, thereof. In one embodiment, each of the transparent members, 18 and 20, includes an external surface, 28 and 30, respectively, disposed at about the Brewster angle to the planar surface, 22 and 24, thereof. Hence, a light beam incident normal to the external surface, 28 or 30, impinges upon the Brewster angle polarizer 26 at the Brewster angle.

Preferably, the polarization reorientation section 14 includes first and second boundary surfaces, 32 and 34, respectively, having a layer 36 of liquid crystal material disposed therebetween. The polarization reorientation section 14 also includes means 38 for creating an electromagnetic field in the layer 36 of liquid crystal material. Typically, the means 38 includes one or more electrodes, 40 and 42, between each boundary surface, 32 and 34, respectively, and the layer 32 of liquid crystal material as well as a voltage source 44 and connecting wires 46.

The light beam combining section 16 preferably includes third and fourth transparent members, 48 and 50, respectively, having planar surfaces, 52 and 54, respectively, and a Brewster angle polarizer 56 disposed between the planar surfaces, 52 and 54. In one embodiment, each of the third and fourth transparent members, 48 and 50, respectively, includes an external surface, 58 and 60, respectively, disposed at about the Brewster angle to the planar surfaces, 52 and 54, respectively, thereof. Preferably, the beam splitter section 12 and the beam combining section 16 are substantially mirror images of each other, both physically and optically.

In the preferred embodiment, the beam splitting section 12 further includes first and second ports, 62 and 64, respectively, adapted to receive optical fibers (not shown in the FIGURE). In general, the optical fibers are affixed to the ports, 62 and 64, and aligned such that light signals therefrom impinge upon the Brewster angle polarizer 26 of the beam splitting section 12 at the Brewster angle. The incidence of a light beam at the Brewster angle causes the plane polarized components thereof to be directed from the Brewster angle polarizer 26 in different directions.

For the geometry of the device 10 set forth above, i.e. the external surfaces, 28 and 30, being disposed at the Brewster angle with the planar surfaces, 22 and 24, respectively, of the transparent members, 18 and 20, respectively, the split components from the Brewster angle polarizer will be incident upon the surfaces, 28 and 30, at an angle at least equal to the critical angle for the air/transparent member interface. Hence the split polarized components will be totally internally reflected. Preferably, the polarization reorientation section 14 is disposed such that the internally reflected polarized components are incident substantially normal thereto. To ensure that the split polarized components are totally internally reflected, the indexes of refraction of the transparent members, 18 and 20, and the Brewster angle polarizer 26 are chosen to ensure that the Brewster angle is less than 90° minus the critical angle. Such an arrangement ensures the total internal reflection at the air/external surface interface since air has a smaller index of refraction than the Brewster angle polarizer 26.

Because of the symmetry of the beam splitting and beam combining sections, 12 and 16, respectively, the polarized components exiting the polarization reorientation section 14 strike the external surfaces, 54 and 56, of the third and fourth transparent members 48 and 50, respectively, at an angle at least equal to, but preferably, slightly greater than, the critical angle for the transparent member/air interface thereby ensuring total internal reflection of the plane polarized components exiting the polarization reorientation section 14. This total internal reflection thus directs both polarized components into a second Brewster angle polarizer 56 whereat the plane polarized components of the incident light beam are recombined and exit via either a third or fourth port, 66 and 68, respectively, associated with the external surfaces, 58 and 60, respectively, of the third and fourth transparent members, 48 and 50, respectively.

As discussed in a number of the above referenced copending patent applications, the polarization reorientation section 14 can be operated in one of two states to effect either a polarization change or to allow a light beam component to traverse the section 14 unchanged. Thus, by the appropriate application of voltage to the electrodes, 40 and 42, of the respective polarization reorientation section 14 the polarized components can be directed to either the third or fourth port, 66 or 68, respectively.

Although the ports, 62, 64, 66 and 68, are pictorially shown as being affixed to the external surfaces, 28, 30, 58 and 60, respectively, of the transparent members 18, 20, 48 and 50, respectively, such is not necessarily required. For example, the technique described and discussed in U.S. patent application Ser. No. 795,156 filed on Nov. 5, 1985 and assigned to the assignee hereof can be utilized. This referenced application is deemed incorporated herein by reference. In that application a design is discussed whereby the optical fibers associated with the liquid crystal switching device are inserted into blind holes formed in transparent members at the appropriate critical angle whereby the alignment of optical fibers for connection to the liquid crystal switching device is readily and accurately effected. To implement such a design into the present device 10 the blind holes would be formed in the transparent members, 18, 20, 48, and 50, at the Brewster angle rather than the critical angle. In such an embodiment, the use of blind holes would then allow the external surfaces, 28, 30, 58 and 60 to be disposed at an angle with respect to the planar surfaces, 22, 24, 52 and 54, respectively, that would ensure both the total internal reflection of the polarized components and the normal incidence thereof upon the polarization reorientation section 14.

In addition, the transparent members 18, 20, 48 and 50 can also be designed to incorporate a collimator therein. Such a collimator is fully described and discussed in U.S. patent application Ser. No. 913,874 entitled "COLLIMATOR" filed on even date herewith and assigned to the assignee hereof. This application is also deemed incorporated therein by reference. In such a collimator a spherical reflecting surface is provided in a molded transparent material whereby an optical fiber can be inserted thereinto such that the end thereof lies in the focal plane of the spherical reflecting surface. As a consequence of the positioning of the optical in the focal plane the resultant reflected light from the spherical mirror is substantially fully collimated.

The Brewster angle polarizers, 26 and 56, can be formed by techniques known in the art and, in one embodiment, include a plurality of layers of transparent material having alternating comparatively larger and comparatively smaller indices of refraction. The principles of such a polarizer are well known in the art and are generally described in an article entitled CROSSPLATE INFRARED POLARIZER by N.J. Harrick in the *Journal of The Optical Society of America*, October, 1964, edition at pages 1281 through 1282. In addition, the references discussed therein, particularly, references 1 through 4, also discuss a number of "pile of plates" polarizers.

Although the present invention has been discussed with respect to a particular embodiment, it will be understood that other arrangements and configurations may also be developed that, nevertheless, do not depart from the spirit and scope of the present invention. Hence, the present invention is deemed limited only by the appended claims and the reasonable interpretation thereof.

What is claimed is:

1. A liquid crystal switching device; said device comprises:
   means, disposed at the Brewster angle to an incident light beam, for splitting said incident light beam into polarized components; and
   means, including a layer of liquid crystal material and disposed in the path of said polarized components, for controllably reorienting the polarization thereof whereby said polarized components can be directed to an output port.

2. Device as claimed in claim 1 further comprises:
   means for deflecting said split polarized components such that said polarized components impinge normal to said polarization reorientation means.

3. Device as claimed in claim 2 wherein said deflecting means includes:
   a surface, said surface being disposed in the path of said polarized components at an angle thereto at least equal to the critical angle thereof.

4. Device as claimed in claim 1 wherein said polarization reorientation means includes:
   first and second boundary surfaces, said layer of liquid crystal material being disposed between said boundary surfaces; and
   means for establishing an electromagnetic field in said layer of liquid crystal material.

5. Device as claimed in claim 4 wherein said electromagnetic field establishing means includes:
   first and second electrodes, said electrodes being disposed on opposing sides of said layer of liquid crystal material.

6. Device as claimed in claim 1 wherein said light beam splitting means includes:
   a first transparent member having a first planar surface;
   a second transparent member having a second planar surface; and
   a first Brewster angle polarizer, said first Brewster angle polarizer being disposed between said first and second planar surfaces.

7. Device as claimed in claim 6 wherein said light beam splitter means further comprises:
   means for deflecting said split polarized components such that said polarized components impinge normal to said polarization reorientation means, said deflecting means including a surface, said surface being disposed in the path of said polarized components at an angle thereto at least equal to the critical angle thereof.

8. Device as claimed in claim 6 wherein said first Brewster angle polarizer comprises:
   a plurality of transparent layers having alternating comparatively larger and comparatively smaller indices of refraction.

9. Device as claimed in claim 8 further comprises:
   means for recombining said polarized components, said recombiner means being disposed in the path of said polarized components subsequent therealong to said polarization reorientation means.

10. Device as claimed in claim 9 further comprises:
    means for deflecting said polarized components subsequent to polarization reorientation means such that said polarized components impinge upon said recombiner means.

11. Device as claimed in claim 10 wherein said recombining means further comprises:
    a third transparent member having a third planar surface;
    a fourth transparent member having a fourth planar surface; and
    a second Brewster angle polarizer, said second Brewster angle polarizer being disposed between said third and fourth planar surfaces.

12. Device as claimed in claim 11 wherein said beam recombining means further comprises:
    a second surface, said second surface being disposed in the path of said polarized components at an angle thereto at least equal to the critical angle thereof.

13. Device as claimed in claim 11 wherein said second Brewster angle polarizer comprises:
    a plurality of transparent layers having alternating comparatively larger and comparatively smaller indices of refraction.

14. Device as claimed in claim 1 further comprises:
    means for recombining said polarized components, said recombining means being disposed in the path of said polarized components subsequent therealong to said polarization reorientation means.

15. Device as claimed in claim 14 further comprises:
    means for deflecting said polarized components, said deflecting means being disposed subsequent to said polarization reorientation means such that said polarized components impinge upon said recombiner means.

16. Device as claimed in claim 15 wherein said recombining means further comprises:
    a first transparent member having a first planar surface;
    a second transparent member having a first planar surface;
    a second transparent member having a second planar surface; and
    a Brewster angle polarizer, said Brewster angle polarizer being disposed between said first and second planar surfaces.

17. Device as claimed in claim 16 wherein said Brewster angle polarizer comprises:
    a plurality of transparent layers having alternating comparatively larger and comparatively smaller indices of refraction.

* * * * *